United States Patent [19]
Gunderson

[11] 3,907,058
[45] Sept. 23, 1975

[54] TRACTION CONTROL DEVICE
[76] Inventor: Ralph R. Gunderson, 8212 S. Homan, Chicago, Ill. 60652
[22] Filed: Mar. 5, 1973
[21] Appl. No.: 337,917

[52] U.S. Cl. .................................. 180/74; 180/74
[51] Int. Cl. ..................... B60k 23/04; B60k 29/00
[58] Field of Search ............... 180/74, 75, 77 R, 29; 188/106 R, 106 P; 192/3 R

[56] References Cited
UNITED STATES PATENTS

| | | | |
|---|---|---|---|
| 1,659,087 | 2/1928 | Dodge | 188/106 R |
| 1,882,467 | 10/1932 | Wilt | 180/75 |
| 2,944,616 | 7/1960 | Bernard et al. | 180/19 R |
| 2,954,836 | 10/1960 | Cavanaugh | 180/74 |
| 3,194,337 | 7/1965 | Parks | 180/74 |
| 3,319,731 | 5/1967 | Kenkel | 180/77 R |
| 3,339,662 | 9/1967 | Hanson et al. | 188/77 R |
| 3,454,125 | 7/1969 | Wagner | 180/74 |

*Primary Examiner*—Kenneth H. Betts
*Assistant Examiner*—Jack D. Rubenstein
*Attorney, Agent, or Firm*—Wegner, Stellman, McCord, Wiles & Wood

[57] ABSTRACT

A vehicle, such as a tractor, having propelling wheels connected by a differential, together with a traction control device for connecting the propelling wheels directly when the differential permits relative motion between the propelling wheels, including a rotatable shaft having friction rollers secured thereon at axially spaced positions to engage the propelling wheels, and means for moving the friction rollers into and out of contact with the propelling wheels, independently of braking and simultaneously with braking.

16 Claims, 8 Drawing Figures

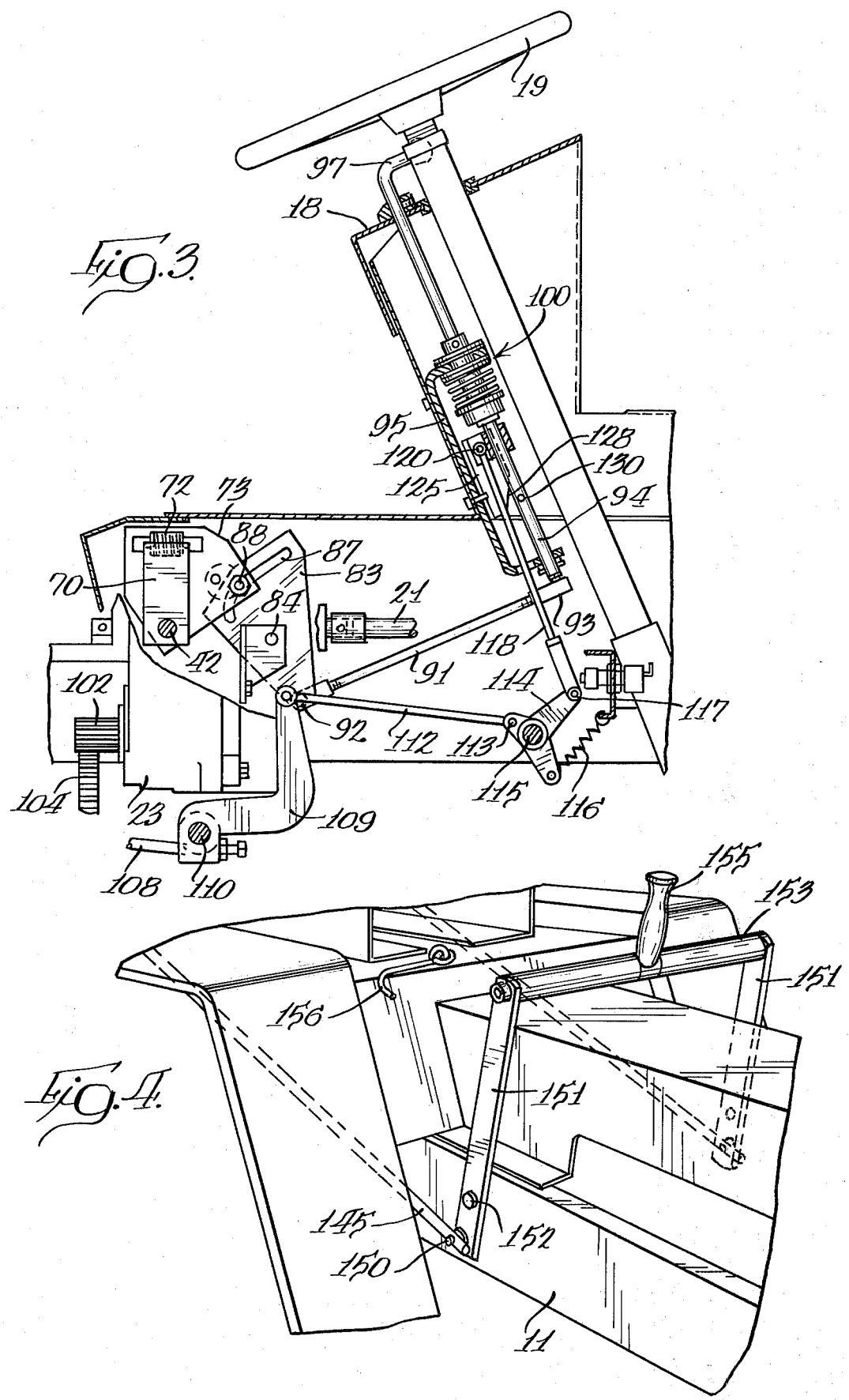

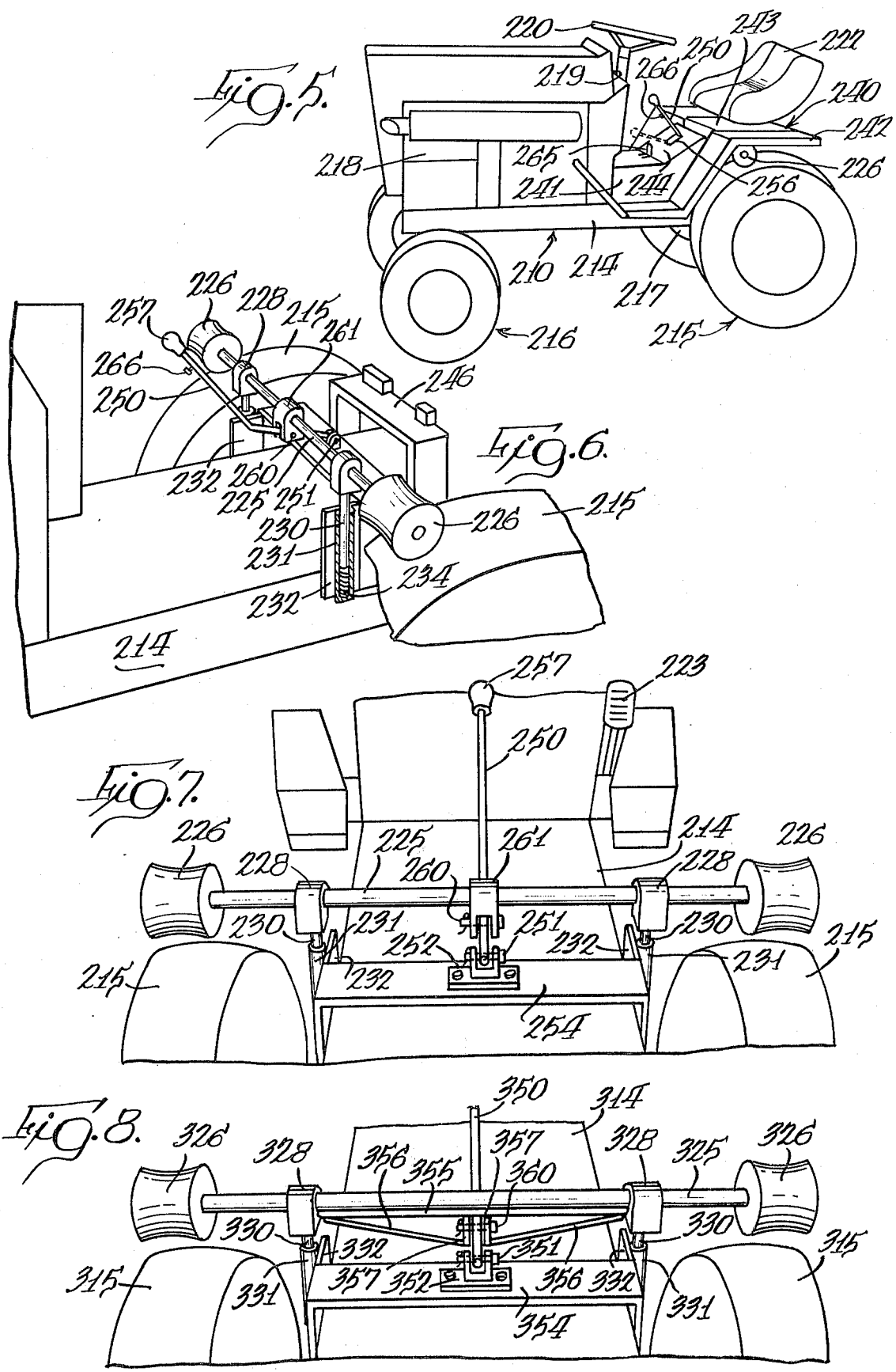

TRACTION CONTROL DEVICE

BACKGROUND OF THE INVENTION

The present invention relates to a traction control device for use in connection with a vehicle having propelling wheels driven through a differential, where the differential permits relative motion between the propelling wheels, either in a propulsion situation or a braking situation, and includes means for connecting the propelling wheels directly by means of a rotatable shaft having friction rollers movable into and out of contact with the propelling wheels.

In the prior art, U.S. Pat. No. 1,882,467 relates to a traction device utilizing a shaft for positively connecting propelling wheels by means of intermeshing gearing on the shaft and the propelling wheels.

U.S. Pat. No. 3,447,622 relates to a device for coupling vehicle drive wheels including a pneumatically actuated, pivotally mounted cross shaft with auxiliary wheels engageable with the vehicle propelling wheels, in an arrangement wherein the coupling device is mounted on the housing for the axle connecting the propelling wheels.

U.S. Pat. No. 3,454,125 shows an external differential lockup with a hydraulically actuated shaft reciprocally mounted on the vehicle body and having corrugated rollers engageable with propelling wheels.

It would be desirable to provide a relatively simple traction control device which may be added to existing vehicles without requiring substantial modification of the propulsion mechanism while permitting integration with existing braking mechanism.

BRIEF SUMMARY OF THE INVENTION

The present invention relates to a new and improved traction control device attachable to existing vehicles without substantial modification of the existing propulsion means and selectively applicable to prevent relative motion between the propelling wheels.

Another object is to provide a new and improved traction control device for use in a vehicle having propelling wheels connected by a differential, including means for directly connecting the propelling wheels when the differential permits relative motion between the propelling wheels in the form of a rotatable shaft having friction rollers thereon at axially spaced positions to engage the propelling wheels, together with means reciprocally mounting the shaft for movement toward and away from the propelling wheels together with means normally resiliently urging the shaft toward a retracted position where the friction rollers are out of contact with the propelling wheels.

As illustrated herein, the device includes manually accessible lever means mounted on the vehicle chassis adjacent to an operator's station for actuating the rotatable shaft in a manner to move the friction rollers toward and away from the propelling wheels.

Preferably, movement of the traction control shaft is guided in a direction to move each friction roller in a path inclined to the periphery of the adjacent wheel at an angle between a radius and a tangent so that rotation of the wheel tends to move the roller toward the wheel.

In an illustrated embodiment, the construction includes bearing means for supporting the traction control shaft at axially spaced positions, means connected to the bearing means for reciprocally mounting the shaft, and actuating means connected to the bearing means.

In an alternative embodiment, the construction includes separate bearing blocks for rotatably supporting the shaft at axially spaced positions, means reciprocally mounting the bearing blocks, and actuating means connected directly to an intermediate portion of the shaft.

It is also an important object of the present invention to provide a new and improved traction control device which may be attached to existing vehicles for selectively preventing relative motion between the propelling wheels, and adapted to be integrated with the existing brake mechanism in a manner such that the traction control device may be applied without applying the brake mechanism, and also applied automatically on application of the brake mechanism.

BRIEF DESCRIPTION OF THE DRAWINGS

FIG. 3 is a sectional view through the vehicle illustrated in FIG. 1, showing the transmission and brake controls;

FIG. 4 is a fragmentary perspective view, illustrating a manual handle for applying the traction control device;

FIG. 5 is a perspective view of a different vehicle such as a garden tractor with an alternative embodiment of a traction control device embodying the principles of the present invention;

FIG. 6 is a fragmentary perspective view of a vehicle illustrated in FIG. 5, with the seat removed, to better illustrate the construction of the traction control device;

FIG. 7 is a rear view of the traction control device illustrated in FIG. 6; and

FIG. 8 is a rear view, similar to FIG. 7, illustrating another embodiment of a traction control device employing the principles of the present invention.

DESCRIPTION OF EMBODIMENT OF FIGS. 1-4

Figure 1:
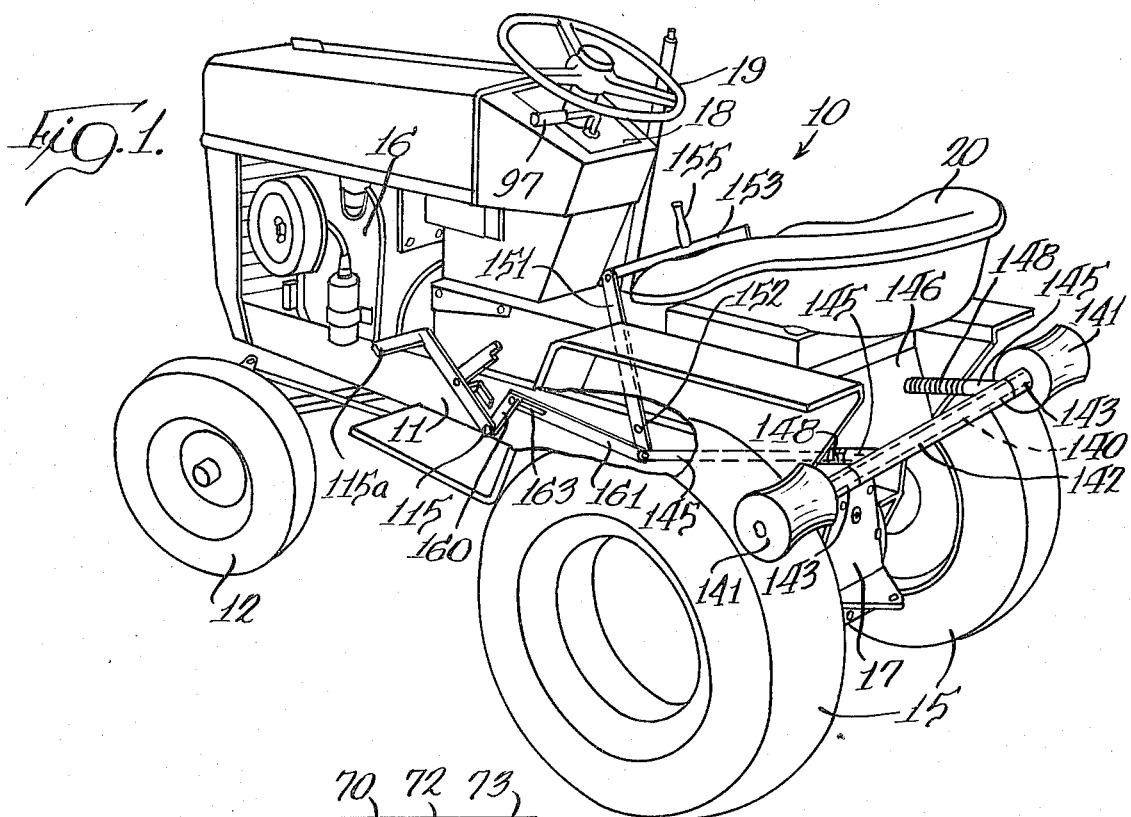
FIG. 1 is a perspective view of a vehicle such as a garden tractor with a traction control device embodying the principles of the present invention.
Figure 2:
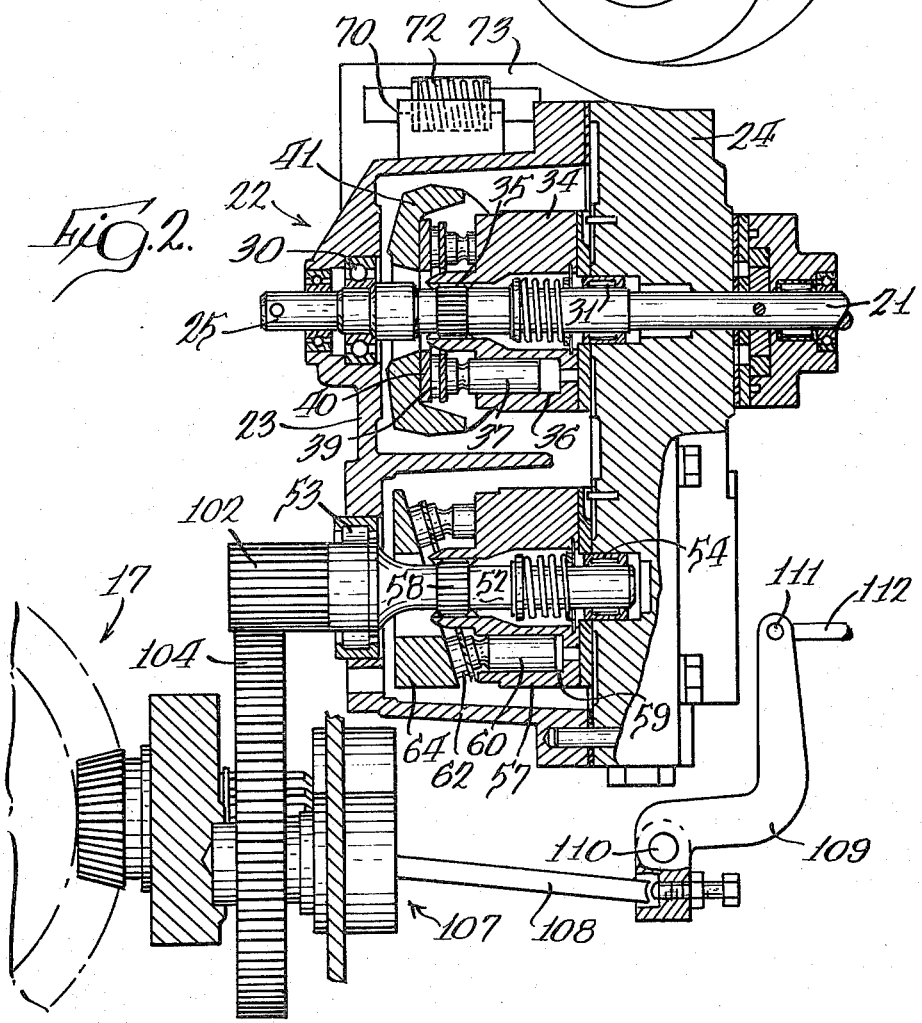
FIG. 2 is a sectional view through the vehicle illustrated in FIG. 1, showing the transmission and brake mechanism.

Referring to FIGS. 1-4, the invention is illustrated in connection with a garden tractor 10 which includes a frame or chassis 11 supported on wheels including a pair of front steering wheels as at 12 and a pair of rear propelling wheels as at 15. In the tractor illustrated, there is a prime mover in the form of a gasoline engine 16 on the front of the chassis 11 connected to drive an appropriate transmission which in turn drives a final differential 17 of conventional construction connected for rotating the propelling wheels 15. The vehicle is adapted to be controlled from a control panel 18 located adjacent to a steering wheel 19 connected for controlling the front wheels 16. The chassis includes a seat 20 on which an operator may be seated in a position accessible to the steering wheel 19 and the control panel 18 for appropriately controlling the engine 18 and the transmission mechanism driven thereby.

The engine 16 is connected to a drive shaft 21 (FIG. 2) that extends into a hydrostatic transmission unit 22 suitably supported on the vehicle chassis. The transmission unit 22 includes a housing 23 and a cover 24 suitably secured together. The drive shaft 21 preferably extends through the transmission unit and outwardly beyond the rear thereof for purposes of providing a power takeoff at 25 if desired.

Drive shaft 21 is journaled in bearing means 30 mounted in housing 23 and bearing means 31 mounted in cover plate 24. The shaft 21 is connected to drive a pump in the hydrostatic transmission 22 including a cylinder block 34 mounted on the shaft and connected for rotation therewith by means of splines as at 35. The cylinder block 34 includes a plurality of axially extending cylinders as at 36, each of which has a reciprocal piston 37. Each piston 37 includes an outer end having a universally mounted bearing slipper 39 engaging a wear plate 40 disposed on a swashplate 41. In order to provide for varying the transmission ratio, the swashplate 41 is pivotally mounted by means of trunnions as at 42 (FIG. 3) which permit angular adjustment of the swashplate about the axis of the trunnions in a manner to vary the displacement of the pump.

Also disposed within the housing 23 is a hydraulic motor driven by fluid under pressure applied from the pump. The motor includes a shaft 52 journaled in a bearing 53 in housing member 23 and a bearing 54 in the cover plate 24. A cylinder block 57 is mounted on the shaft 52 and constrained for rotation therewith by means of splines 58. The cylinder block 57 includes a plurality of axially extending cylinders as at 59 each having a reciprocal piston 60 therein. The outer end of each piston includes a universally mounted bearing slipper 62 disposed in sliding contact with an inclined surface of a swashplate 64 stationarily mounted in the housing 23.

The specific construction of the hydrostatic transmission forms no part of the present invention and need not be described in complete detail. It will be understood that suitable conduits are provided for interconnecting the pump and motor in closed hydraulic circuit, so that variation in the angular position of the pump swashplate 41 may be utilized to vary the transmission ratio in infinite increments in opposite directions from neutral. In order to vary the angular position of the swashplate 41, and arm 70 (FIG. 3) is secured on the trunnion 42 and connected by means of a spring mechanism 72 to a drive plate 73 in a manner such that the arm 70 and the plate 73 normally move together, but may move relative to each other upon compression of the spring mechanism.

In order to actuate the plate 73, a cam plate 83 is pivotally mounted at 84 and includes a cam slot 87 eccentric relative to the pivot 84 and receiving a stud 88 on the plate 73. The cam plate 83 is actuated by means of a link 91 having one end secured at 92 to the plate 83 and having an opposite end secured at 93 to an arm fixed on a rotatable shaft 94. The shaft 94 is rotatably mounted in a U-shaped bracket 95 supported on the chassis in an appropriate manner. The shaft 94 includes an angularly disposed handle 97 at the upper end adjacent the control panel 18 accessible to an operator in the seat 20 for controlling the hydrostatic transmission. The shaft 94 is frictionally held in angularly adjusted positions by means of a spring-biased friction restraint generally designated 100.

In order to transmit power from the hydrostatic transmission to the propelling wheels, the motor shaft 52 extends outwardly from the housing 23 and includes a gear 102 thereon meshing with a gear 104 which functions as an input to the differential 17. To provide for mechanical braking of the vehicle, a conventional braking mechanism 107 is positioned to frictionally retard rotation of the gear 104 responsive to energization through an actuating member such as a connecting rod 108. For controlling application of the brake mechanism 107, the rod 108 has a lost motion connection with a crake member 109 pivotally mounted at 110. The upper end of the crank 109 is pivotally connected at 111 to one end of a link 112 having an opposite end pivotally connected at 113 to a bell crank 114 fixed on a pivotal shaft 115. The shaft 115 is suitable journaled in the vehicle frame or chassis, and includes a brake pedal 115a (FIG. 1) fixed thereon and accessible to an operator in the seat 20. It will be understood that depression of the foot pedal 115a may be utilized to transmit motion to apply the brake mechanism 107.

The bell crank 114 is yieldably urged in a counter-clockwise direction by means of a spring 116. The crank is pivotally connected at 117 to a link 118 having an upper end connected at 120 to a cam slide 125 with cam means as at 128 engageable with a transverse pin 130 in the shaft 94. In operation, the arrangement is such that on depression of the brake pedal 115a, to turn the shaft 115 in a clockwise direction, as viewed in FIG. 3, the link 114 is drawn downwardly to slide the cam means 128 against the pin 130 in a manner to return the hydrostatic transmission toward neutral when the mechanical braking means 107 is applied.

The vehicle as described thus far is a substantially conventional structure which is described in more detail in U.S. Pat. No. 3,354,981, for example. In operation, inclination of the pump swashplate 41 from a neutral central position responsive to actuation of the manually accessible handle 97 results in putting the hydrostatic transmission into operation if the engine 16 is running and driving the input shaft 21. Operation of the pump supplies fluid to the motor, and in turn the differential 17 is driven to rotate the propelling wheels 15. Generally, the supply of power to the differential 17 has the effect of rotating the propelling wheels 15 in substantially equal amounts at substantially equal rates. However, it is well known that the differential 17 is utilized for the purpose of permitting relative movement between the propelling wheels 15, for example, when the vehicle is negotiating a curved path in which the propelling wheels follow tracks of different lengths. As a result of the necessary provision of the differential, it is possible to encounter unusual situations in which one of the propelling wheels is located on a slippery surface such as ice, and the other propelling wheel is located on a rougher surface, so that the wheel on ice spins and the other wheel remains stationary without moving the vehicle. Similarly, it is possible to obtain relative motion of the propelling wheels in a braking situation, as on an incline, where one wheel may be locked on ice and the other wheel continues to rotate without stopping the vehicle. This is particularly true in the construction illustrated above where the brake mechanism 107 is applied to a single input shaft for the differential 17 rather than applying braking mechanism separately to each wheel. However, even with individual wheel brakes, it is possible for the brakes to be out of adjustment and to encounter a situation in which the application of individual wheel brakes will result in locking one of the wheels while permitting the other to continue rotation.

According to the present invention, a traction control device is provided for connecting the propelling wheels directly when the differential permits relative motion between such wheels, in a manner to prevent relative movement, either in a propulsion situation or in a braking situation. to this end, a transverse shaft 140 (FIG. 1) is disposed at the rear of the vehicle, and at opposite ends the shaft has friction elements 141 thereon rotatable with the shaft. The elements 141 are spaced appropriately for movement into and out of contract with the peripheral surface of the rubber-tired wheels 15. The friction elements 141 may be integral roughened portions of the shaft or separate rollers constructed of suitable frictional material appropriate for good tractive contact with the propelling wheels 15. For example, the rollers may be molded of hard rubber or yieldable plastic material, such as high molecular weight polyethylene, keyed on the shaft and having studs or other projections thereon.

The shaft 140 is rotatably support in a bearing tube 142 which is shorter than the shaft 140, so that opposite ends of the shaft project outwardly beyond opposite ends of the bearing tube. If desired, appropriate spacers may be mounted on the shaft 140 as at 143, between the end of the bearing tube and the end of the adjacent friction roller 141. For purposes of mounting the bearing tube 142, it is rigidly connected to a pair of laterally spaced plungers or rods as at 145 which extend forwardly through apertures in a depending skirt 146 on the tractor chassis. The rods 145 thus are reciprocally mounted on the chassis and restrained against substantial movement in a direction laterally relative to the rods. Each rod 145 carries a coiled compression spring 148 bearing against the skirt 146 and urging the rods rearwardly in a direction to normally yieldably maintain the friction rollers 141 out of contact with the propelling wheels 15.

In order to provide for movement of the friction rollers into contact with the propelling wheels, the rods 145 extend forwardly to a position adjacent the operator's station, and each has its forward end pivotally connected at 150 to the lower end of a lever 151 (FIG. 4) pivotally mounted on the chassis as at 152 between the chassis and adjacent fender. At the upper ends, the levers 151 are connected by a transversely extending cross member 153 having a central upright handle 155 accessible to an operator at the control station.

In operation, the friction rollers 141 are normally retracted to a position out of contact with the propelling wheels because of the bias of springs 148. In the event that a condition is encountered wherein one of the propelling wheels slips on a nontractive surface while the other wheel remains stationary on a tractive surface, preventing progresss of the vehicle, movement of the handle 155 rearwardly results in movement of the friction rollers into contact with the propelling wheels. As a result of the frictional contact of the rollers and the propelling wheels, relative motion between the propelling wheels is prevented. Under these circumstances, motion of the rotating wheel on the nontractive surface is transmitted to the wheel on the tractive surface, as a result of which the torque transmitted to the wheel on the tractive surface is utilized to set the vehicle in motion. If desired, provision may be made for locking the handle 155 or the cross member 153 in an actuated position to hold the friction rollers in contact with the propelling wheels for extended periods of time without the constant attention of the operator. For example, such a locking means may comprise a hook as illustrated at 156 releasably engageable with the handle 155.

In order to prevent relative motion between the propelling wheels on application of the braking mechanism 107, it is desirable to provide for application of the friction rollers 141 to the propelling wheels 15 on actuation of the brake pedal 115a. To this end, a lost motion connection is provided between one of the levers 151 and the brake pedal 115a. In particular, an arm 160 (FIG. 1) is provided on the brake pedal shaft 115, and a link 161 is connected between the arm 160 and one of the levers 151. As illustrated, the link 161 has a pivotal connection with the lower end of lever 151 as illustrated at 162. At the opposite end, the link 161 has a pin and slot connection 163 with the arm 160.

In operation, the handle 155 may be utilized to apply the friction rollers to the propelling wheels without applying the brake mechanism, for the reason that the link 161 will slide on the pin carried by arm 160 on the brake pedal. On the other hand, when the brake pedal 115a is depressed, motion of the arm 160 in a counter-clockwise direction pulls the link 161 in a direction to apply the friction rollers to the propelling wheels. Under these circumstances, even if only one of the propelling wheels is capable of being braked, as on a steep incline, and the other wheel tends to rotate on a tractive surface and permit vehicle motion, the friction rollers will prevent rotation of the other wheel. Accordingly, the restraint of the wheel on the tractive surface results in retarding motion of the vehicle.

DESCRIPTION OF EMBODIMENT OF FIGS. 5–7

Referring now to FIGS. 5–7, a traction control device embodying the present invention is illustrated in connection with a garden tractor 210 including a chassis 214 supported on wheels including a pair of rear propelling wheels as at 215 and a pair of front steering wheels as at 216. In the tractor illustrated, there is a prime mover in the form of a gasoline engine 218 on the front of the chassis 214 connected to drive an appropriate transmission in turn arranged for rotating the propelling wheels 215 through a final differential 217. The engine is adapted to be controlled from a control panel 219 located adjacent to a steering wheel 220 arranged to control the front wheels 216. The control panel 219 and the steering wheel 220 are adjacent to a seat 222 on which an operator may be seated in a position accessible to the steering wheel and the control panel for appropriately controlling the engine 218 and the transmission mechanism driven thereby. A brake pedal 223 enables application of mechanical brakes associated with the propelling wheels 215.

A traction control device for directly connecting the propelling wheels 215 includes a transversely extending shaft 225 having friction rollers 226 secured on opposite ends thereof and axially spaced at positions which enable movement of the friction rollers into and out of contact with the periphery of the rubber-tired wheels 215. The shaft 225 is rotatably supported in spaced bearing blocks 228 in turn mounted on the chassis 214 in a manner to permit movement of the shaft 225 toward and away from the propelling wheels. As in the previously described embodiment, the friction rollers 226 may be molded of relatively hard but somewhat yieldable plastic material carrying studs which provide adequate traction for transferring torque from one of the propelling wheels 215 to the other. The bearing blocks 228 may be molded of suitable plastic bearing material.

In order to mount the bearing blocks 228 on the chassis, each is constructed with an integral mounting rod or plunger 230 preferably having one end molded into the material 228. The free end of each plunger 230 is reciprocally mounted in a tubular guide 231 carried on a mounting plate 232 secured to the side of the chassis 214. Each of the tubular guides 231 is closed at the lower end and houses a coiled compression spring 234 seated in a manner to resiliently urge the plunger 230 upwardly in a direction to normally yieldably maintain the friction rollers 226 in a retracted position out of contact with the propelling wheels 215.

On reference to FIG. 5, it will be understood that the chassis 214 includes a floorboard and fender panel 240 which is formed at the front to provide a transmission tunnel 241 and at the sides with fenders 242, and between the fenders 242 with a seat support 243. The seat support 243 is joined to the transmission tunnel by a curved front wall 244. The floorboard and fender member 240 is appropriately secured at the front end to the chassis 214, while a rear portion beneath the seat support 243 is rested on a transverse beam 246 on the chassis 214 between the propelling wheels 215. The traction control is mounted beneath the floorboard and seat support member 240, as will be understood on viewing FIG. 5. In the illustrations of FIGS. 6 and 7, the member 240 has been removed in order to more clearly illustrate the construction of the traction control device.

For purpose of moving the friction rollers 226 into contact with the propelling wheels 215, a manually accessible control lever 250 is pivotally mounted at 251 on a bracket 252 supported on a transverse beam 254 in turn mounted on the chassis 214. From the pivotal mounting 251 at the lower end, the lever 250 extends forwardly and upwardly through an elongated slot aperture 256 in the front wall 244 of the floorboard and seat support member 240. At the upper terminus, the lever 250 includes a hand grip knob 257 which is located to be accessible immediately forwardly of an operator in the seat 222. Intermediate the opposite ends of the lever 250, and adjacent to the pivotal mounting 251, the lever 250 is pivotally connected at 260 to a link 261 in the form of an elongated block of suitable bearing material pivotally mounted on a central portion of the shaft 225.

In operation, the compression springs 234 in the guides 231 normally urge the plungers 230 upwardly to maintain the friction rollers 226 out of contact with the propelling wheels 215. With the friction rollers retracted, as illustrated in FIG. 7, the manual lever control 250 is disposed in an upper position as illustrated in full lines in FIG. 5. In the event of a situation where one propelling wheel may be located on a slippery surface such as ice, and the other wheel is located on a tractive surface, such that the one wheel spins while the other is stationary, and the progress of the vehicle is interrupted, the manual lever 250 may be moved downwardly to the broken line position illustrated in FIG. 5, whereupon the friction rollers 226 are moved into frictional tractive contact with propelling wheels 215. Under these circumstances, the motion of the spinning wheel is transferred to the stationary wheel, so that the two wheels travel in unison and the wheel on the tractive surface is utilized for propelling the vehicle out of the stalled condition. Preferably, provision is made for locking the manual lever 250 in operative position with the friction rollers in contact with the propelling wheels. For such purposes, a resiliently mounted hook may be provided on the transmission tunnel at 265 in a position to engage a projecting headed stud 266.

DESCRIPTION OF EMBODIMENT OF FIG. 8

In the embodiment of FIG. 8, a traction control device is illustrated positions connection with a tractor similar to that shown in FIGS. 5–7. A transversely disposed shaft 325 has friction rollers 326 secured thereon at laterally spaced position where the rollers are adapted for movement toward and away from propelling wheels 315 disposed at opposite sides of a chassis 314. The shaft 325 is rotatably supported in spaced bearing blocks 328 located at opposite sides of the chassis. Each of the mounting blocks 328 includes a rigid plunger or rod 330 reciprocally mounted in a tubular guide 331 carried by a mounting plate 332. Each mounting plate 332 is suitably secured to the side of the chassis 314, and each tubular guide member 331 preferably includes a coiled compression spring (not visible) similar to that illustrated at 234 in FIGS. 5–7 for purposes of normally yieldably urging the rods 330 upwardly in a direction to retract the friction rollers 326 out of contact with the propelling wheels 315.

For purposes of moving the friction rollers 326 into contact with the propelling wheels 315, a control lever 350 is pivotally mounted at 351 on a bracket 352 in turn secured on a supporting beam 354 mounted on the chassis 314. The lever 350 is connected with mounting blocks 328 by means of a link in the form of a transverse brace. Such brace includes a transverse rod 355 having opposite ends pivotally mounted respectively in the mounting blocks 328. Inclined brace rods 356 include outer ends welded to the rod 355 and inner ends welded to posts 357 in turn welded on rod 355. An intermediate portion of handle lever 350 is pivotally connected to the posts 357 at 360. Thus, downward movement of the lever 350 draws the friction rollers 326 downwardly into contact with the propelling wheels 315.

It should be understood that while the invention has been illustrated in connection with four-wheel tractors having propelling wheels at the rear and steering wheels at the front, the invention may be used with other constructions such as those involving front-wheel drive, articulated chassis and two wheels only, for example. The term "chassis" is used broadly to refer to any stationarily mounted portion of the vehicle or machine such as chassis, frame, body, skirts, fenders, covers, handles and the like. The term "control station" is used to refer to the vicinity of a control panel or other area where vehicle or machine controls are located, whether in a four-wheel or two-wheel machine.

I claim:

1. In a vehicle having a chassis with propelling wheels connected by a differential, a torque transfer device operable from an operator's station on the vehicle for connecting the propelling wheels directly to transfer torque from one wheel to the other when the differential permits relative rotation between the wheels, comprising: a torque transfer assembly including a rotatable shaft, friction elements fixed on the shaft and spaced apart axially to engage the propelling wheels of the vehicle, and bearing means rotatably supporting the shaft at spaced position between the friction elements on the shaft; lever means pivotally secured to the chassis and connected to the torque transfer assembly for moving the friction elements of said assembly toward and away from the propelling wheels, the lever means including an actuating means adjacent the operator's station movable between an inoperative position in which the friction elements are spaced from the propelling wheels and an operative position in which the friction elements engage the propelling wheels; and spring means for normally urging the assembly away from the propelling wheels so that the actuating means is in inoperative position.

2. A device as specified in claim 1 in which the torque transfer assembly includes a pair of reciprocal plungers connected to the bearing means and to the lever means for reciprocating movement on opposite sides of the chassis to move the friction elements toward and away from the propelling wheels.

3. A device as specified in claim 1 in which locking means are provided to retain the actuating means in operative position.

4. A device as specified in claim 2 in which the bearing means is a bearing tube rotatably supporting the shaft between the friction elements.

5. A device as specified in claim 2 in which the spring means includes a spring positioned on each of the plungers to act between the chassis and the bearing means to normally urge the friction elements away from the propelling wheels.

6. A device as specified in claim 5 in which means are provided for guiding the reciprocating movement of the plungers in a direction to move each friction element in a path inclined to the periphery of the adjacent wheel at an angle between a radius and a tangent so that rotation of each wheel tends to move each friction element toward its respective wheel.

7. In a vehicle having a chassis with an engine, an operator's station, and propelling wheels driven by the engine through a differential, a torque transfer device for connecting the propelling wheels directly to transfer torque from a spinning wheel to the nonspinning wheel when the differential permits relative motion between the wheels, comprising,
 a. a rotatable shaft having friction rollers fixed thereon spaced apart axially to engage the propelling wheels of the vehicle,
 b. a bearing tube rotatably supporting the shaft between the friction rollers thereon,
 c. a pair of mounting rods connected to the bearing tube at spaced positions thereon and reciprocally mounted on opposite sides of the chassis for movement of the friction elements toward and away from the propelling wheels,
 d. spring means on the rods acting between the chassis and the bearing tube to normally urge the friction rollers out of contact with the propelling wheels,
 e. a pair of levers pivotally mounted on the chassis adjacent the operator's station and pivotally connected respectively to the rods for actuating the latter to move the friction rollers into contact with the propelling wheels,
 f. a cross member connecting the levers for operation together, and
 g. a handle on the cross member.

8. In a vehicle having a chassis with an engine, an operator's station, propelling wheels driven by the engine through a differential, a torque transfer device for connecting the propelling wheels directly to transfer torque from a spinning wheel to the nonspinning wheel when the differential permits relative motion between the wheels, comprising,
 a. a rotatable shaft having friction rollers fixed thereon spaced apart axially to engage the propelling wheels of the vehicle,
 b. bearing blocks rotatably supporting the shaft at spaced positions between the friction rollers thereon,
 c. a pair of rods connected to the bearing blocks and projecting radially therefrom and reciprocally supported on the chassis adjacent opposite sides thereof,
 d. spring means normally urging the friction rollers out of contact with the propelling wheels,
 a. link pivotally mounted on the shaft, and
 f. a lever pivotally mounted on the chassis adjacent the operator's station and pivotally connected to the link to move the friction rollers into contact with the propelling wheels.

9. A combination as defined in claim 8, including means on the chassis to lock the lever in a position with the rollers in torque transfer contact with the wheels.

10. In a vehicle having a chassis with an engine, an operator's station, propelling wheels driven by the engine through a differential, a torque transfer device for connecting the propelling wheels directly to transfer torque from a spinning wheel to the other wheel when the differential permits relative motion between the wheels, comprising,
 a. a rotatable shaft having friction rollers fixed thereon spaced apart axially to engage the propelling wheels of the vehicle,
 a pair of bearing blocks on opposite ends of the shaft,
 c. a pair of rods connected to the bearing blocks and projecting radially therefrom and reciprocally supported in the chassis adjacent opposite sides thereof,
 d. spring means acting between the chassis and the bearing blocks to normally urge the friction rollers out of contact with the propelling wheels,
 e. a brace having opposite ends pivotally mounted on the bearing blocks, and
 f. a lever pivotally mounted on the chassis adjacent the operator's station and pivotally connected to the brace to move the friction rollers downwardly into contact with the propelling wheels.

11. In a vehicle having a chassis with propelling wheels, a differential for driving the propelling wheels, an engine, a transmission driven by the engine and driving the differential, brake means for braking at least one propelling wheel, and a brake pedal for operating the brake means, a traction control device for connecting the propelling wheels directly when the differential permits relative motion between the wheels, comprising,
 a. a rotatable shaft having friction elements fixed thereon spaced apart axially to engage the propelling wheels of the vehicle,
 b. movably mounted bearing means rotatably supporting the shaft,
 c. means normally maintaining the friction elements out of contact with the propelling wheels, d. means for moving the friction elements into contact with the propelling wheels on application of the brake means, and
e. means for moving the friction elements into contact with the propelling wheels without application of the brake means.

12. A combination as defined in claim 11, wherein the braking means is applied between the engine and the differential.

13. In a vehicle having a chassis with propelling wheels, a differential for driving the propelling wheels, an engine driving the differential, brake means for braking the propelling wheels, and a brake pedal for operating the brake means, a device for connecting the propelling wheels directly when the differential permits relative motion between the wheels, comprising,
a. a rotatable shaft having friction elements fixed thereon spaced apart axially to engage the propelling wheels,
b. bearing means rotatably supporting the shaft,
c. means movably mounting the bearing means for movement of the shaft toward and away from the propelling wheels,
d. actuating means for moving the shaft to engage the friction elements with the propelling wheels, and
e. lost motion means connecting the brake pedal and the actuating means to permit operation of the actuating means without operating the brake means, and to move the shaft to engage the friction elements with the propelling wheels on operation of the brake pedal.

14. A combination as defined in claim 13, including a bearing tube rotatably supporting the shaft at spaced positions, mounting means connected to the bearing tube and reciprocally mounted on the chassis, lever means mounted on the chassis and connected for moving the bearing tube toward and away from the propelling wheels, and a link connecting the lever means and the brake pedal with a lost motion connection to permit operation of the lever means without operating the brake pedal and to cause operation of the mounting means on operation of the brake pedal.

15. In a vehicle having a chassis with propelling wheels, a differential for driving the propelling wheels, an engine, a transmission driven by the engine and including an output shaft driving the differential, brake means for braking the output shaft, and a brake pedal for operating the brake means, a traction control device for connecting the propelling wheels directly when the differential permits relative motion between the wheels, comprising,
a. a rotatable shaft having friction rollers fixed thereon spaced apart axially to engage the propelling wheels of the vehicle,
b. bearing means rotatably supporting the shaft between the friction rollers thereon,
c. rods attached to the bearing means and reciprocally supported on the chassis,
d. lever means pivotally mounted on the chassis and pivotally connected respectively to the rods for actuating the latter to move the friction rollers into contact with the propelling wheels, and
e. lost motion means connecting the brake pedal and said lever means to permit operation of the lever means without actuating the brake pedal, and causing actuation of the rods on actuation of the brake pedal.

16. In a vehicle having a chassis with propelling wheels, a differential for driving the propelling wheels, and engine, a transmission driven by the engine and including an output shaft driving the differential, brake means for braking the output shaft, and a brake pedal for operating the brake means, a traction control device for connecting the propelling wheels directly when the differential permits relative motion between the wheels, comprising,
a. a rotatable shaft having friction rollers fixed thereon spaced apart axially to engage the propelling wheels of the vehicle,
b. a bearing tube rotatably supporting the shaft between the friction rollers thereon,
c. a pair of rods attached to the bearing tube and projecting radially therefrom and reciprocally supported on the chassis adjacent opposite sides thereof,
d. spring means to normally urge the friction rollers out of contact with the propelling wheels,
e. a pair of levers pivotally mounted adjacent the operator's station and pivotally connected respectively to the rods for actuating the latter to move the friction rollers into contact with the propelling wheels,
f. means connecting the levers for operation together, and
g. lost motion link means connecting the brake pedal and one of said levers to permit operation of the levers without actuating the brake pedal, and causing actuation of the levers on actuation of the brake pedal.

* * * * *